United States Patent
Toguchi et al.

(10) Patent No.: US 7,170,692 B2
(45) Date of Patent: Jan. 30, 2007

(54) MECHANICAL CAM TYPE ZOOM LENS DEVICE

(75) Inventors: Masaaki Toguchi, Hakusan-cho (JP); Yasuhiro Kondo, Mizuho-ku (JP)

(73) Assignee: Elmo Co., Ltd., Aichi (JP)

( * ) Notice: Subject to any disclaimer, the term of this patent is extended or adjusted under 35 U.S.C. 154(b) by 98 days.

(21) Appl. No.: 11/093,711

(22) Filed: Mar. 30, 2005

(65) Prior Publication Data
US 2005/0237638 A1    Oct. 27, 2005

(30) Foreign Application Priority Data
Apr. 23, 2004    (JP)    ............................. 2004-128131

(51) Int. Cl.
*G02B 7/09* (2006.01)
(52) U.S. Cl. ..................... 359/698; 359/697; 359/823
(58) Field of Classification Search ................ 359/819, 359/823, 694–698; 396/300, 97
See application file for complete search history.

(56) References Cited

U.S. PATENT DOCUMENTS 6,924,941 B2 *    8/2005    Okada et al.    ............... 359/698

2005/0019030 A1 *    1/2005    Sasaki et al.    ............... 396/300

* cited by examiner

*Primary Examiner*—Ricky Mack
*Assistant Examiner*—M. Hasan
(74) *Attorney, Agent, or Firm*—Koda & Androlia

(57) ABSTRACT

A mechanical cam type zoom lens device includes a movement position detector detecting movement positions of focus and zoom lenses moved by respective drivers, a reference compensation value calculating unit setting a plurality of zooming positions for a zoom lens when a focus lens is located at a predetermined focusing position and calculating an amount of movement from a predetermined focusing position in a case where the focus lens is adjusted to be in focus when the zoom lens is located at each set zooming position, the calculated amount of movement serving as a reference compensation value, a storage storing data of the reference compensation values, a focusing compensation value calculating unit calculating a focusing compensation value for the focus lens in a case where the zoom lens is located at the movement position, based on the set zooming positions, the reference compensation value read from the storage and the movement position of the zoom lens, and a focusing unit focusing the focus lens based on the calculated focusing compensation value so that the focus lens is focalized.

8 Claims, 9 Drawing Sheets

MECHANICAL CAM TYPE ZOOM LENS DEVICE

BACKGROUND OF THE INVENTION

1. Field of the Invention

This invention relates to a mechanical cam type zoom lens device.

2. Description of the Related Art

A zoom lens is provided with a zooming mechanism. In the zoom lens, a subject distance is kept unchanged during a zooming operation and even after the zooming operation. A general mechanical cam type zoom lens includes two or more lens groups coupled to a cam cylinder. When the zoom lens is to be zoomed, a cam ring is turned so that each lens group is moved along a cam groove of the cam cylinder. A focusing ring is turned so that one or more lens groups coupled to a body tube by screws or the like are moved. Thus, zooming and focusing are carried out by different lens groups in the zoom lens, and focusing is not carried out during zooming when a stationary subject is photographed.

The aforementioned mechanical cam type zoom lens device is composed of a number of components. When components of the lens and a zooming mechanism and the like have errors, a locus of a cam groove proper to the lens is changed such that the lens becomes out of focus during zooming. In view of this problem, the dimensional accuracy of the components has generally been improved. However, improving the dimensional accuracy of the components increases the production cost and reduces the yield in a step of manufacturing the components.

SUMMARY OF THE INVENTION

Therefore, an object of the present invention is to provide a mechanical cam type zoom lens device which is inexpensive and which can be prevented from being out of focus during zooming, which out-of-focus results from errors in the components.

The present invention provides a mechanical cam type zoom lens device comprising a focus lens, a focus lens driver moving the focus lens along an optical axis so that a subject is in focus, a zoom lens, a zoom lens driver moving the zoom lens along the optical axis by a predetermined cam groove, a controller controlling each driver, a movement position detector detecting movement positions of the focus and zoom lenses moved by the drivers respectively, a reference compensation value calculating unit setting a plurality of zooming positions for the zoom lens when the focus lens is located at a predetermined focusing position and calculating an amount of movement from the predetermined focusing position in a case where the focus lens is adjusted to be in focus when the zoom lens is located at each set zooming position, the calculated amount of movement serving as a reference compensation value, a storage storing data of the reference compensation values, a focusing compensation value calculating unit calculating a focusing compensation value for the focus lens in a case where the zoom lens is located at the movement position, based on the set zooming positions, the reference compensation value read from the storage and the movement position of the zoom lens, and a focusing unit focusing the focus lens based on the calculated focusing compensation value so that the focus lens is focalized.

In the foregoing zoom lens device, the reference compensation value calculating unit sets a plurality of zooming positions for the zoom lens when the focus lens is located at a predetermined focusing position. The reference compensation value calculating unit further calculates an amount of movement from the predetermined focusing position in a case where the focus lens is adjusted to be in focus when the zoom lens is located at each set zooming position. The calculated amount of movement serves as a reference compensation value which is stored by the storage. A focusing compensation value calculating unit calculates a focusing compensation value for the focus lens in a case where the zoom lens is located at the movement position, based on the set zooming positions, the reference compensation value read from the storage and the movement position of the zoom lens. The focus lens is focused on the basis of the calculated focusing compensation value so that the focus lens is focalized. Accordingly, since the focus lens is prevented from out-of-focus during zooming, the dimensional accuracy of the components need not be increased more than necessary in the production steps. Consequently, an increase in the production cost and a reduction in the yield in the component manufacturing step are suppressed and accordingly, an inexpensive zoom lens device can be provided.

In one form, the zoom lens device further comprises a section calculating unit executing calculation to obtain a section which is defined between the zooming positions adjacent to each other and in which the movement position of the zoom lens detected by the position detector is contained. In this construction, the focusing compensation value calculating unit reads from the storage each reference compensation value at the adjacent set zooming positions and executes linear interpolation for the section between the adjacent set zooming positions containing the movement position, based on the adjacent set zooming positions, each reference compensation value and the movement position of the zoom lens, thereby calculating a focusing compensation value of the focus lens. Consequently, since the equation for calculating the focusing compensation value is simplified, soft and hard arrangements of the zoom lens device can be simplified, whereupon the production cost can be reduced.

In another form, the focus lens includes a body tube and a focusing ring having a first driving gear so as to be moved in synchronization with the body tube and the focus lens driver includes a first drive motor driving the first driving gear of the focusing ring and a first motor driver supplying driving power to the first drive motor. The zoom lens includes a zooming ring having a second driving gear and the zoom lens driver includes a second drive motor driving the second driving gear of the zooming ring and a second motor driver supplying driving power to the second drive motor. The zoom lens device further comprises a lens controlling microcomputer provided with a control program and supplying a driving power supply signal to each of the first and second motor drivers based on the control program. Since the focus and zoom lenses are driven by the respective driving motors, a drive control manner can be simplified and an inexpensive zoom lens device can be provided.

In further another form, the movement position detector includes a potentiometer detecting an amount of rotation of each of the focus and zoom lenses as a voltage value, an analog/digital converter converting the voltage detected by the potentiometer to a digital signal, and a lens control microcomputer provided with a control program and detecting the movement position of each of the focus and zoom lenses based on the converted digital signal and the control program. Since the potentiometer is used to detect the movement position of each of the focus and zoom lenses, the arrangement for the detection of movement position can be simplified and an inexpensive mechanical cam type zoom lens device can be provided.

BRIEF DESCRIPTION OF THE DRAWINGS

Other objects, features and advantages of the present invention will become clear upon reviewing the following description of the embodiment with reference to the accompanying drawings, in which.

DETAINED DESCRIPTION OF THE INVENTION

Figure 1:
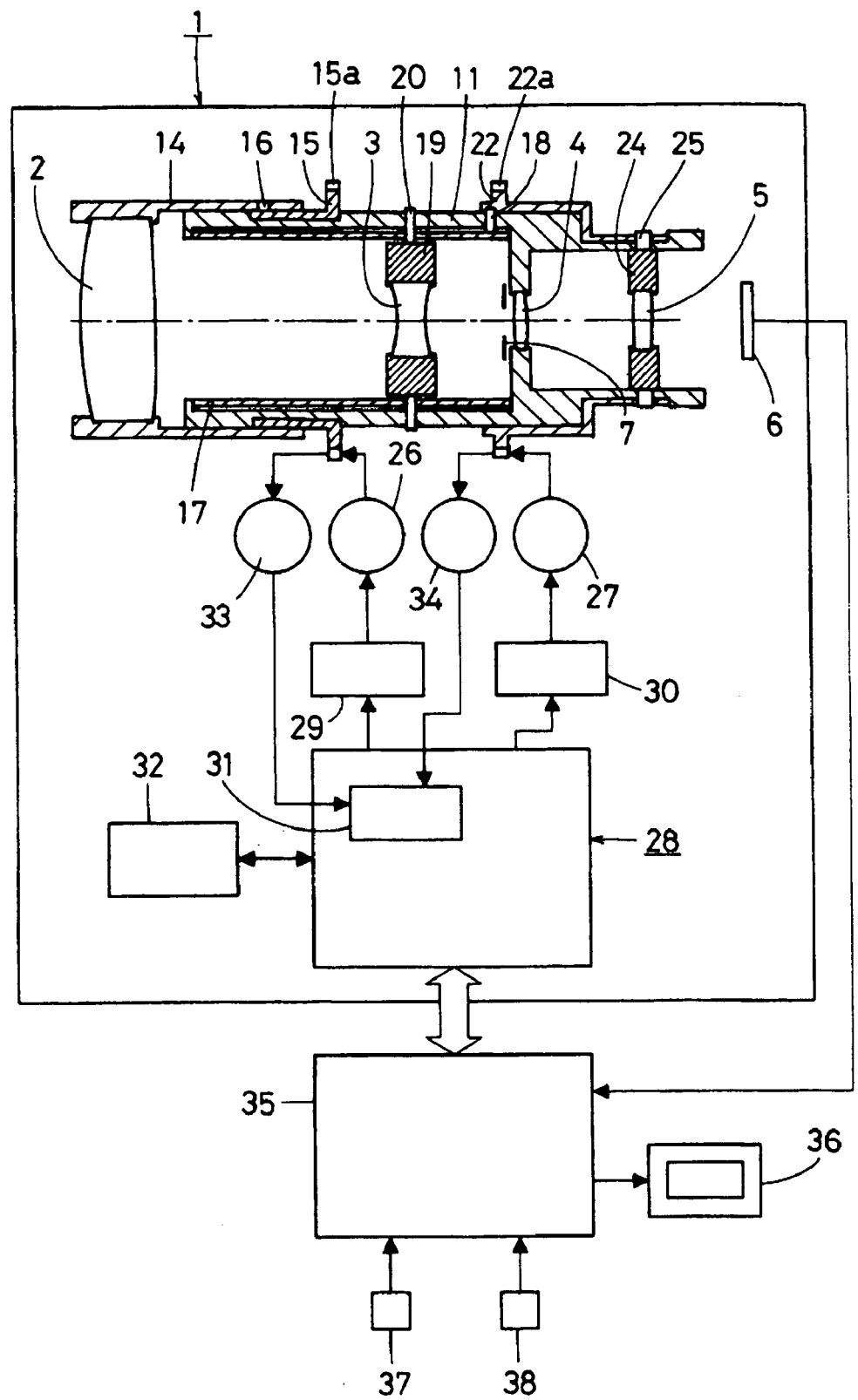
FIG. 1 is a schematic block diagram showing a predetermined system in which the zoom lens device of one embodiment in accordance with the present invention is incorporated.

One embodiment of the present invention will be described with reference to the accompanying drawings. Referring to FIG. 1, the mechanical cam type zoom lens device 1 of the embodiment is shown as being incorporated in a predetermined system. The zoom lens device 1 includes a first lens group 2 serving as a focus lens, a second lens group 3 serving as a zoom lens, a third fixed lens group 4 and a fourth lens group 5 correcting variations in a focal position caused by zooming. An image pickup device 6 such as a charge coupled device (CCD) has a light-receiving surface on which an image of an object is formed. The first lens group 2 is moved along the optical axis so that a zoom ratio is determined. A diaphragm 7 is provided in front of the third lens group 4 for adjusting an iris.

Figure 2:
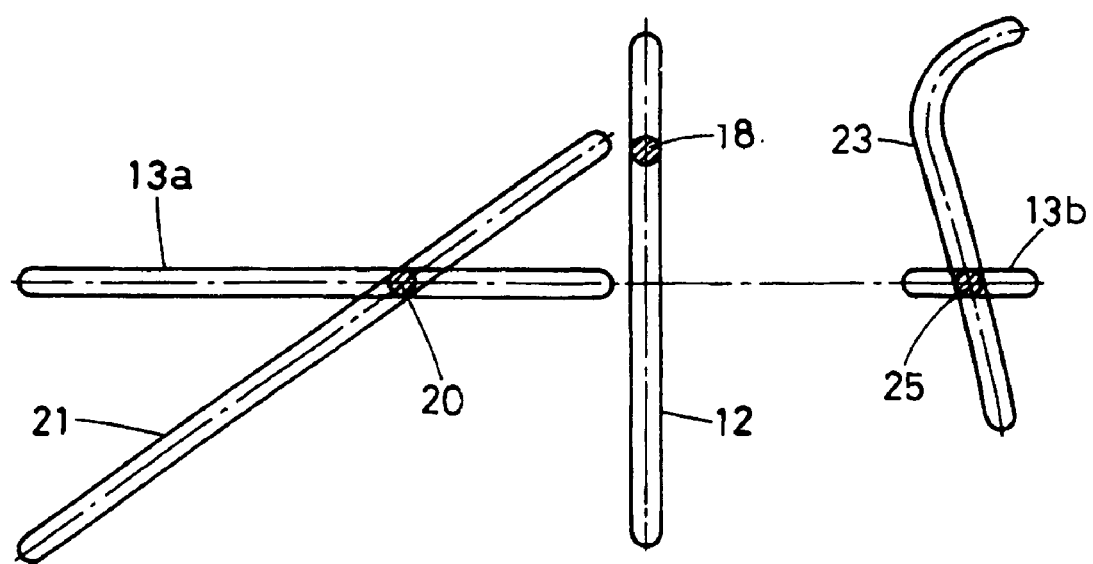
FIG. 2 illustrates guide grooves and a cam groove.

A lens body tube 11 is provided for supporting the third lens group 4. The lens body tube 11 has a radially extending guide groove 12 and two guide grooves 13a and 13b extending along the optical axis as shown in FIG. 2. The lens body tube 11 has a distal end with an outer periphery to which a focus lens body tube 14 is attached by screws (not shown) so as to be movable along the optical axis. A focusing ring 15 is rotatably attached to the outer periphery of the lens body tube 11 so as to be located in the rear of the focus lens body tube 14. The focus lens body tube 14 is coupled to the focusing ring 15 by a pin 16 provided on the focusing ring so as to be linked with the focusing ring. Accordingly, upon rotation of the focusing ring 15, the focus lens body tube 14 is moved along the optical axis, so that an object is focused. Furthermore, the outer periphery of the focusing ring 15 is formed with gear teeth 15a.

A cam cylinder 17 is rotatably attached to an inner periphery of the lens body tube 11. The cam cylinder 17 has a guide pin 18 mounted on an outer periphery of a distal end thereof. The guide pin 18 is in engagement with the radial guide groove 12 of the lens body tube 11. A lens frame 19 supporting the second lens group 3 is attached to an inner periphery of the cam cylinder 17 so as to be movable along the optical axis. The lens frame 19 is provided with a pair of radially protruding guide pins 20. The guide pins 20 are in engagement with a cam groove 21 formed in the cam cylinder 17 and the guide groove 13a of the lens body tube 11.

A zooming ring 22 is rotatably attached to the outer periphery of the rear end thereof. The zooming ring 22 is formed with a cam groove as shown in FIG. 2. The guide pin 18 of the cam cylinder 17 is in engagement with an outer periphery of a distal end of the zooming ring 22. As a result, the cam cylinder 17 is rotated in synchronization with rotation of the zooming ring 22. Furthermore, the outer periphery of the zooming ring 22 is formed with gear teeth 15a.

A lens frame 24 supporting the fourth lens group 5 is attached to an inner periphery of the rear end of the lens body tube 11 so as to be movable along the optical axis. The lens frame 24 is provided with a pair of radially protruding guide pins 25. The guide pins 25 are in engagement with the guide groove 13b of the lens body tube 11 and the cam groove 23 of the zooming ring 22. Accordingly, upon rotation of the zooming ring 22, the cam groove 23 is also rotated so that the guide pins 25 is guided by the guide groove 13b, whereby the fourth lens group 5 is moved along the optical axis. Furthermore, since the distal end of the zooming ring 22 is in engagement with the guide pin 18, the cam cylinder 17 is rotated in synchronization with the zooming ring 22. Upon rotation of the cam cylinder 17, the second lens group 3 is also moved along the optical axis so that zooming is carried out, since the guide pin 20 of the lens frame 19 is in engagement with the cam groove 21 of the cam cylinder 17 and the guide groove 13a of the lens body tube 11.

The focusing and zooming rings 15 and 22 have the gear teeth 15a and 22a which are in engagement with gears (not shown) of drive motors 26 and 27 respectively. A lens control microcomputer 28 delivers control signals. Based on the control signals, motor drivers 29 and 30 supply driving power to the drive motors 26 and 27 so that the drive motors are driven, respectively. The lens control microcomputer 28 comprises a central processing unit (CPU), memories, various interfaces such as a communication interface none of which are shown, an analog-to-digital (A/D) converter 31, an electrically erasable programmable read-only memory (EEPROM) 32 which is a non-volatile memory.

Potentiometers 33 and 34 are provided so as to correspond to the focus and zooming rings 15 and 22 rotated by the drive motors 26 and 27 respectively. The potentiometers 33 and 34 include respective resistors. Each resistor has both ends across which a constant voltage is applied. Voltage between one of terminals of each resistor and a wiper is supplied to the A/D converter 31. An amount of rotation of each of the focus and zooming rings 15 and 22 is converted to digital data, which is stored on the memory of the lens control microcomputer 28. Rotary encoders may be employed instead of the potentiometers 33 and 34.

The above-described zoom lens device 1 is, in its use, incorporated into a predetermined system. When components of the lenses and a zooming mechanism and the like have errors caused in manufacturing steps, the lens becomes out of focus at a zooming position during zooming. A reference compensation value is used to calculate a position of the focus lens at which it is focused, as will be described later. The reference compensation value is peculiar to each product of zoom lens device 1. Accordingly, before incorporated into the system, the zoom lens device 1 is attached to a suitable jig (not shown) so that a reference compensation value is calculated to be stored on EEPROM 32.

Figure 3:
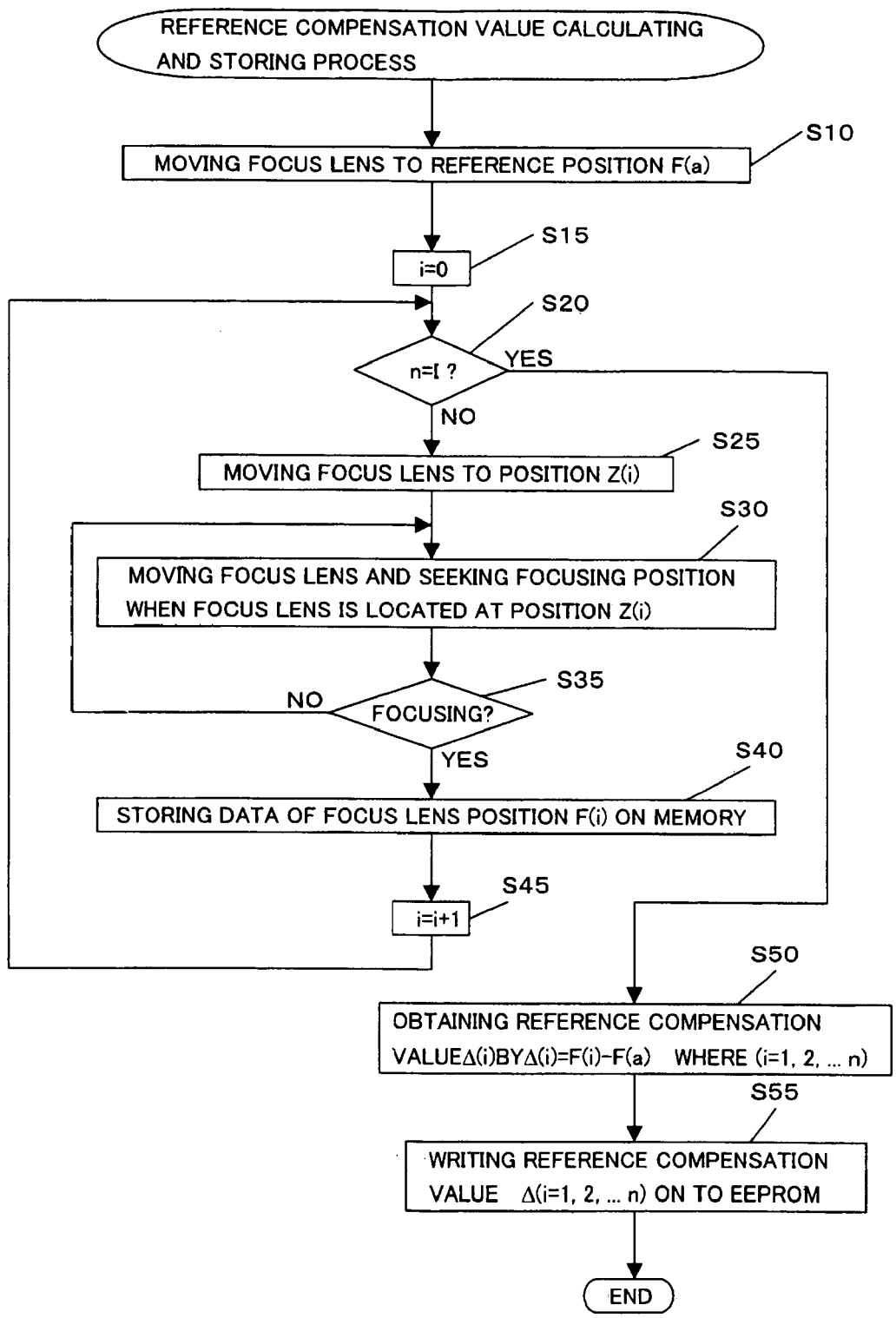
FIG. 3 is a flowchart showing a process of calculating and storing the reference compensation value.

FIG. 3 is a flowchart showing the process of calculating the reference compensation value. In the following description, a combination of the second and fourth lens groups 3 and 5 will be referred to as "zoom lens." When the processing starts, the focus lens 2 is moved to a reference position F(a) at step S10. The reference position F(a) is a position of the focus lens 2 calculated on the basis of a reference subject distance set in the process of calculating and storing a reference compensation value.

Figure 4:
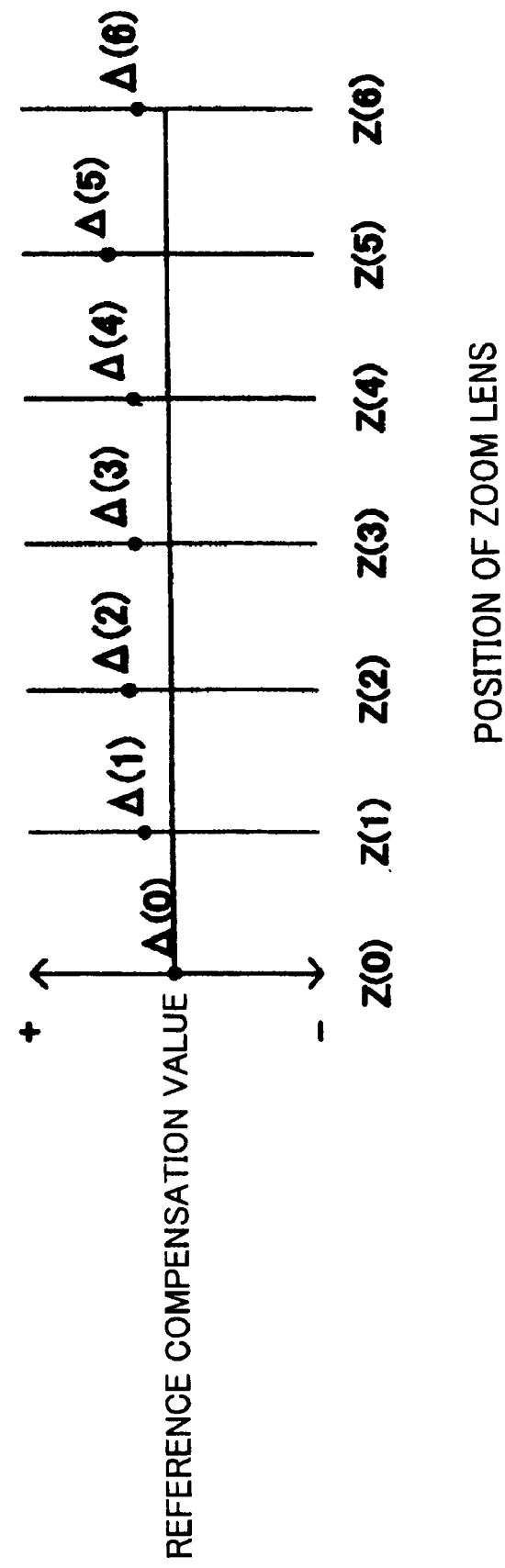
FIG. 4 is a graphical representation of a set zooming position and the reference compensation value.

At step S15, 0 (i=0) is substituted for variable I and the control sequence advances to step S20. At step S20, determination is made as to whether the set number of times of reference compensation value calculation, n=i, has been reached. In this case, as shown in FIG. 4, the position of the zoom lens is set at Z(0) to Z(6), that is, seven zoom lens positions are set and accordingly n=6. Data of the zoom lens positions Z(0) to Z(6) are previously stored on the memory of the lens control microcomputer 28. When the processing starts, i=0 and n≠1, the control sequence advances to step S25, where the zoom lens is moved to position Z(i). At step S30, until the focusing state is confirmed at subsequent step S35, the focus lens is moved so that the focused position is sought in a case where the zoom lens is located at position Z(i).

When the focusing state has been confirmed at step S35, the control sequence advances to step S40 where data of the position F(i) of the focus lens is stored on the memory. When i=0, the position F(0) of the focus lens agrees with the reference position F(a). Variable i is incremented at step S45 and the control sequence returns to step S20 to repeat the processing to step S45. Consequently, the memory stores data of the positions F(0) to F(6) in the focusing state of the focus lens in the case where the zoom lens is located at positions Z(0) to Z(6).

When it is determined at step S20 that n=1, the control sequence advances to step S50, where the reference compensation value Δ(i) is obtained from Δ(i)=F(i)−F(a) in the case where the zoom lens is located at positions Z(0) to Z(6). At step S55, data of the reference compensation values Δ(0) to Δ(6) are written onto EEPROM 32 and thereafter, the reference compensation value calculating and storing process is completed.

The zoom lens device 1 for which the reference compensation value calculating and storing process has been completed is incorporated into the predetermined system such as a suspended visual presenter used for presentation in a large hall, for example. In this case, the lens control microcomputer 28 executes various predetermined operation control programs, based on command signals from a system control microcomputer 35. The system control microcomputer 35 comprises CPU, memories, various interfaces, an image pickup device, an image display circuit and the like. Image data can be taken from the image pickup device 6 to be process so that an image is displayed on a monitor 36.

Furthermore, the system control microcomputer 35 is supplied with signals from operating switches 37 and 38 to instruct normal and reverse rotation of the focus and zooming rings 15 and 22. Still furthermore, an operation instruction signal is also supplied from an iris adjusting switch to the system control microcomputer 35. Based on each of the aforementioned input signals, the system control microcomputer 35 executes a predetermined control program thereby to deliver various signals such as a zooming instruction signal, a focusing instruction signal or the like. Additionally, the system control microcomputer 35 synthetically controls the system on the basis of the predetermined control programs.

Figure 5:
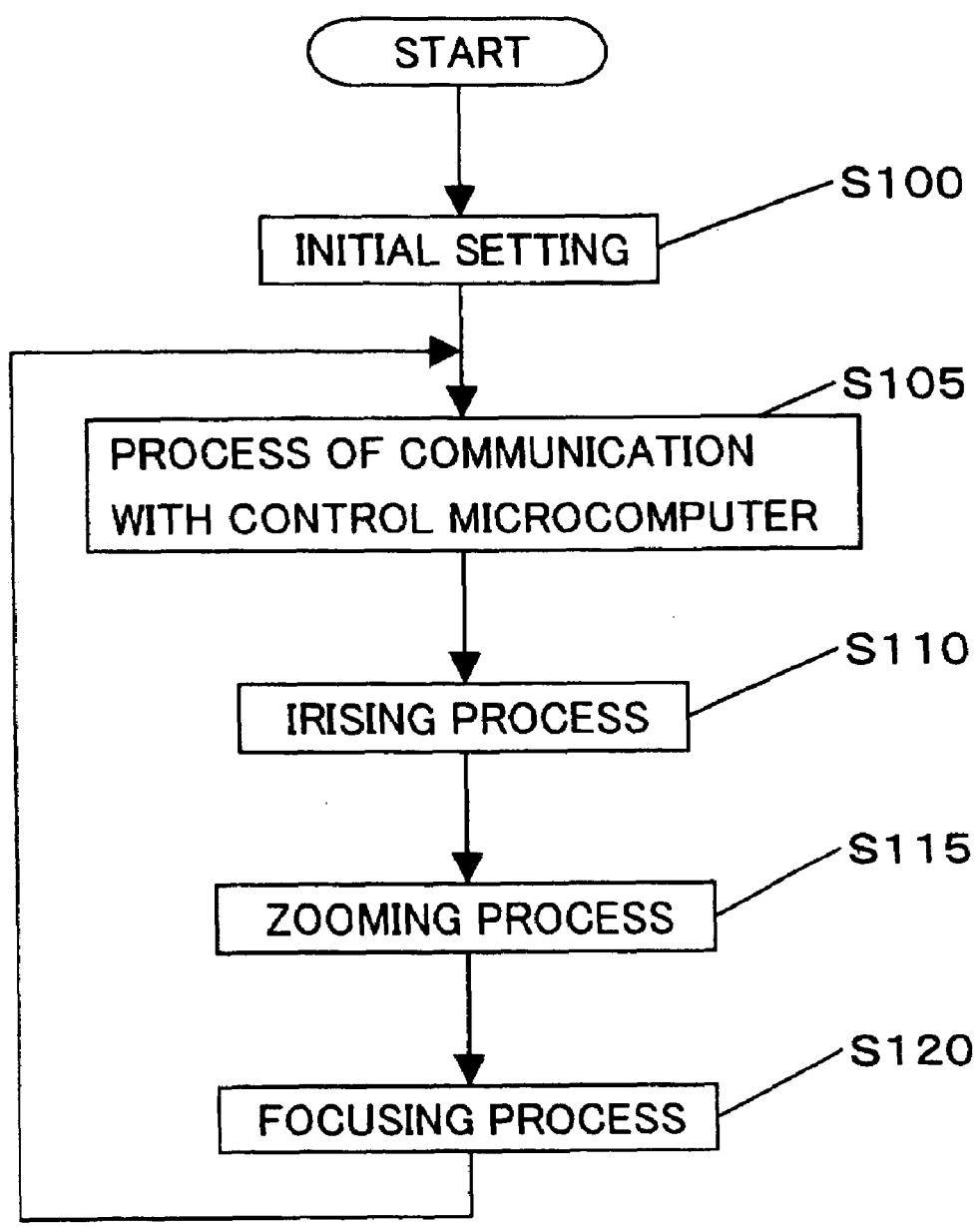
FIG. 5 is a flowchart schematically showing the lens control process.

FIG. 5 is a flowchart schematically showing the lens control process executed by the lens control microcomputer 28. Firstly, initial setting is carried out for RAM, various ports and the like of the lens control microcomputer 28 at step S100. A communication process with the system control microcomputer 35 is executed at step S105. More specifically, the lens control microcomputer 28 receives operation commands for iris, zoom and focus from the system control microcomputer 35, transmitting information about iris, zoom and focus of the lenses to the system control microcomputer 35.

At step S110, the lens control microcomputer 28 supplies a control signal to an iris driving circuit (not shown) on the basis of an iris operating command. At step S115, the lens control microcomputer 28 calculates a zoom-lens position based on the zooming command and the zoom control program, carrying out zooming. In this case, the lens control microcomputer 28 obtains a focus lens focusing compensation value in order to correct variations in the focal position due to error in the components of the zoom lens device 1 as will be described later. The lens control microcomputer 28 calculates the position of the focus lens based on the obtained compensation value to move the first lens group 2 serving as the focus lens. Subsequently, at step S120, the lens control microcomputer 28 calculates a focus-lens position based on the focusing command and the focus control program, moving the first lens group 2. Thereafter, the lens control microcomputer 28 repeats steps S105 to S120.

Figure 6:
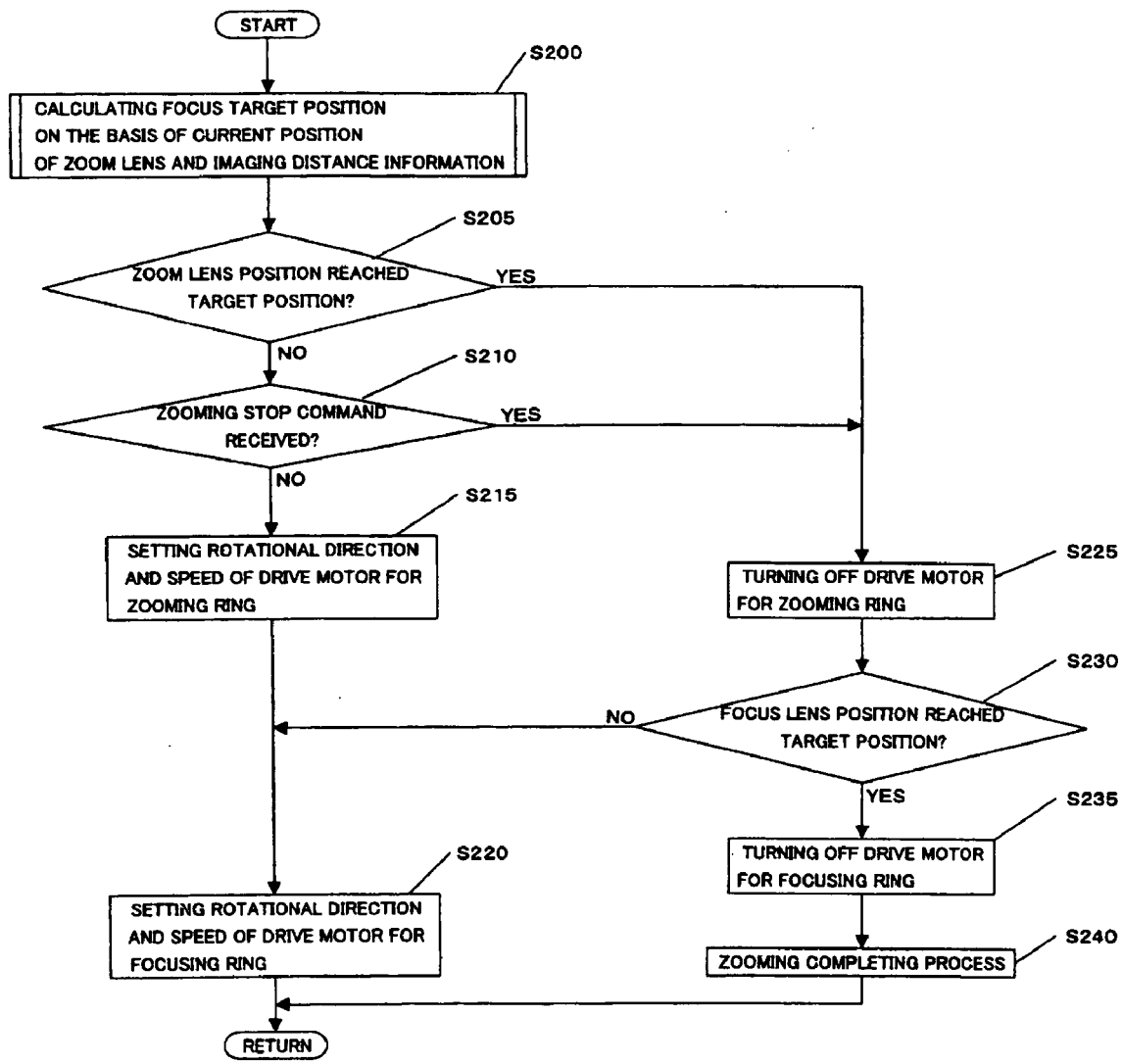
FIG. 6 is a flowchart showing the zooming process.

FIG. 6 is a flowchart showing the zooming process executed at the aforementioned step S115. Upon start of the process, the lens control microcomputer 28 calculates a current zoom-lens position supplied via the A/D converter 31 and a target position of the first lens group 2 as the focus lens on the basis of current imaging distance information. Subsequently, at step S205, the lens control microcomputer 28 determines whether the current zoom-lens position is equal to the target zoom-lens position designated by the system control microcomputer 35.

When determining that the current zoom-lens position is not equal to the target zoom-lens position, the lens control microcomputer 28 advances to step S210 to determine whether a zooming stop command has been received from the system control microcomputer 35. When receiving no zooming stop command, the lens control microcomputer 28 calculates rotational direction and speed of the driving motor 27 driving the zooming ring 22 based on the deviation of the current zoom-lens position from the target zoom-lens position. The lens control microcomputer 28 supplies a control signal to the motor driver 30, advancing to step S220.

The lens control microcomputer 28 advances to step S225 to turn off the drive motor 27 when determining at step S205 that the current zoom-lens position is equal to the target zoom-lens position or when determining at step S210 that the zooming stop command has been received. Subsequently, at step S230, the lens control microcomputer 28 determines whether the focus-lens target position calculated at step S200 is equal to the supplied current focus-lens position. When determining at step S230 that the focus-lens target position is not equal to the supplied current focus-lens position, the lens control microcomputer 28 advances to step S220 to calculate rotational direction and speed of the drive motor 26 driving the focusing ring 15 based on the deviation of the current focus-lens position from the target focus-lens position. The lens control microcomputer 28 supplies a control signal to the motor driver 2. When determining at step S230 that the focus-lens target position is equal to the supplied current focus-lens position, the lens control microcomputer 28 advances to step S235 to turn off the drive motor 26. Subsequently, the lens control microcomputer 28 advances to step S240 to carry out the zooming completing process.

Figure 7:
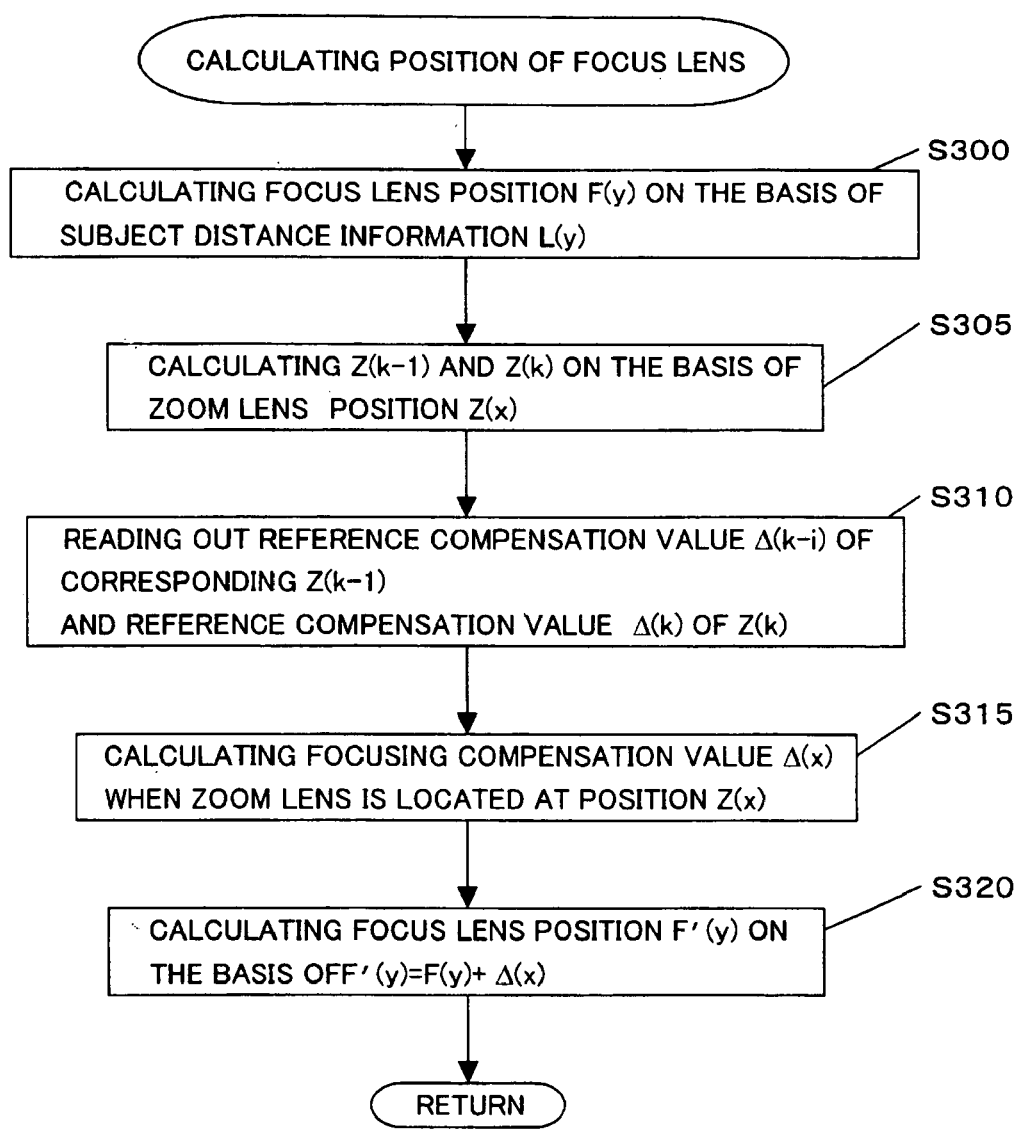
FIG. 7 is a flowchart showing the focus position calculating process.
Figure 8:
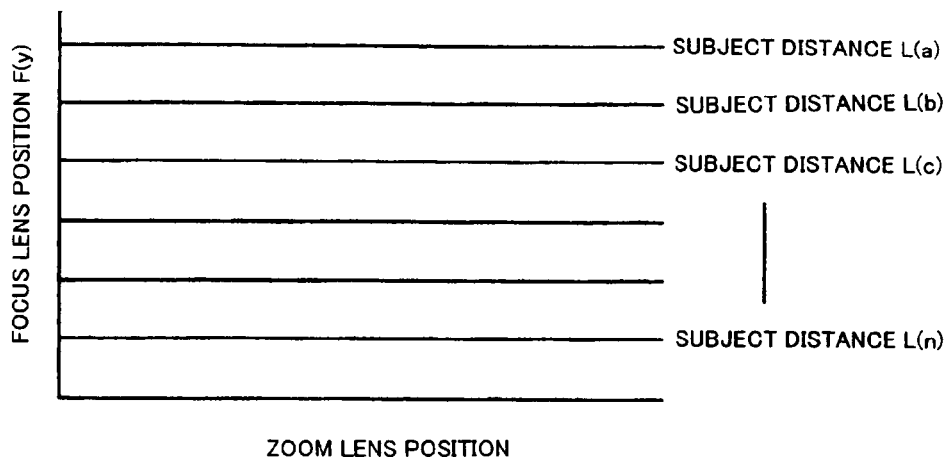
FIG. 8 is a graphical representation showing the relationship between the position of the focus lens and information about distance to the subject.

FIG. 7 is a flowchart showing the focusing position calculating process executed at the aforementioned step 200 of the zooming process. Upon start of the process, at step S300, the lens control microcomputer 28 calculates a focus-lens position $F(y)$ based on information about current subject distance L where y=a to n. The focus-lens position $F(y)$ is uniquely obtained on the basis of the subject distance information $L(y)$ irrespective of the position of the zoom lens, as shown in FIG. 8. Subsequently, at step S305, the lens control microcomputer 28 executes calculation to obtain a section between two set zooming positions $Z(k-1)$ and $Z(k)$ adjacent to each other out of set zoom-lens positions $Z(0)$ to $Z(6)$ where k=1 to 6, in which section the current zoom-lens position $Z(x)$ is contained. At step S310, the lens control microcomputer 28 reads corresponding reference compensation values $\Delta(k-1)$ and $\Delta(k)$ out of those $\Delta(i)$ the microcomputer 28 has read from EEPROM 32 into the memory thereof in the initial setting process at step S100 as shown in FIG. 5.

At subsequent step S315, from the set zooming positions $Z(k-1)$ and $Z(k)$, zoom-lens position $Z(x)$ and $\Delta$ reference compensation values $(k-1)$ and $\Delta(k)$, the lens control microcomputer 28 obtains a focusing compensation value $\Delta(x)$ with respect to the focus-lens position $F(y)$ in the case where the zoom lens is located at zoom lens position $Z(x)$:

$$\alpha=(Z(k)-Z(x))/(Z(k)-Z(k-1)) \tag{1}$$

$$\beta=(Z(x)-Z(k-1))/(Z(k)-Z(k-1)) \tag{2}$$

$$\Delta(x)=\alpha\times\Delta(k-1)+\beta\times\Delta(k) \tag{3}$$

Figure 9:
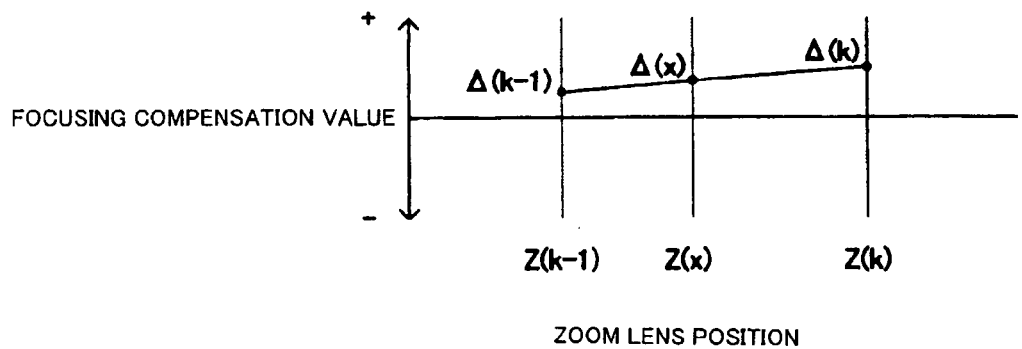
FIG. 9 is also a graphical representation showing the case where the focusing compensation value is obtained by the linear interpolation of the set section between the zooming positions.

Thus, as shown in FIG. 9, when the zoom-lens position $Z(x)$ is located in the section between the set zooming positions $Z(k-1)$ and $Z(k)$, the focusing compensation value $\Delta(x)$ with respect to the focus-lens position $F(y)$ is obtained by a linear interpolation between the set zooming positions $Z(k-1)$ and $Z(k)$.

At subsequent step S320, based on the focus-lens position $F(y)$ and the focusing compensation value $\Delta(x)$, the focusing position $F'(y)$ is obtained by the following equation:

$$F'(y)=F(y)+\Delta(x) \tag{4}$$

Figure 10:
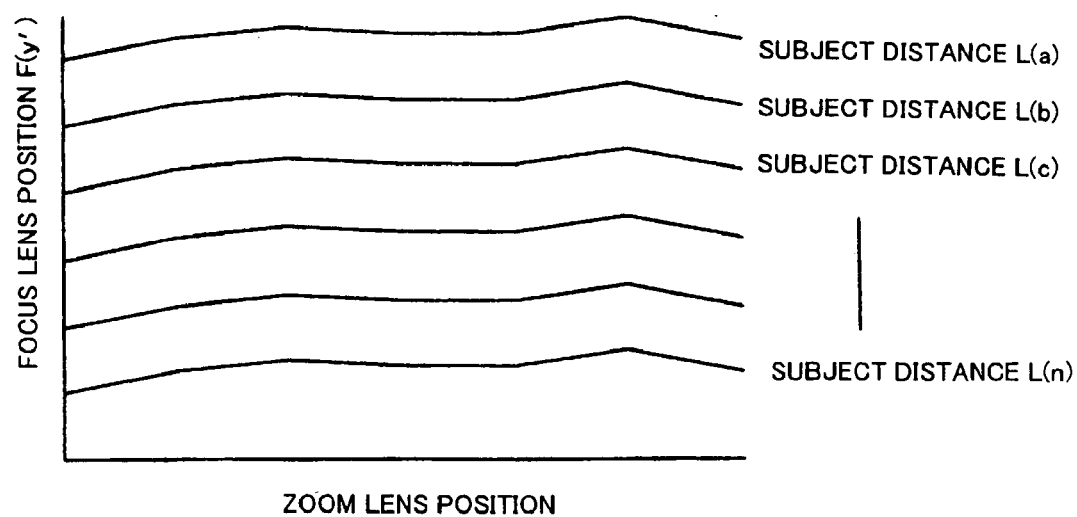
FIG. 10 is a diagrammatic view obtained by combining focusing positions of the focus lens.

The focusing compensation value $\Delta(x)$ between each section between the set zooming positions by the linear interpolation, whereby a diagram as shown in FIG. 10 is obtained by combining focusing positions $F'(y)$ of the focus lens.

In the above-described zoom lens device 1, data of an amount of movement $\Delta(i)=F(i)-F(a)$ is calculated as the reference compensation value to be stored on EEPROM 32. The movement amount refers to that from the focusing position in the case where the focus lens is focused at a plurality of zooming positions $Z(i)$ set for the zoom lens when the focus lens is located at the predetermined focusing position. Based on each set zooming position $Z(i)$, each reference compensation value $\Delta(i)$ and the zoom-lens movement position $Z(x)$, the focusing compensation value $\Delta(x)$ in the zoom lens movement position $Z(x)$ is calculated. The focus lens is thus adjusted on the basis of the obtained focusing compensation value $\Delta(x)$.

Consequently, the dimensional accuracy of the components is not required to be increased more than necessary in order that the zoom lens may be prevented from being out of focus during zooming. Accordingly, an increase in the production cost and a reduction in the yield in the component manufacturing step can be suppressed. Furthermore, since the focus and zoom lenses are driven by the respective drive motors, the drive control can be simplified. Additionally, since the potentiometers are provided to detect the movement positions of the focus and zoom lenses respectively, the arrangement for detection of movement position can be simplified and accordingly, an inexpensive mechanical cam type zoom lens device can be provided.

Furthermore, the lens control microcomputer 28 executes calculation to obtain a section between two set zooming positions $Z(k-1)$ and $Z(k)$ adjacent to each other. The reference compensation values $\Delta(k-1)$ and $\Delta(k)$ in the case where the zoom lens is located at the set zooming positions $Z(k-1)$ and $Z(k)$ respectively. The linear interpolation is executed for the section between the set zooming positions $Z(k-1)$ and $Z(k)$, based on the set zooming positions $Z(k-1)$ and $Z(k)$, reference compensation values $\Delta(k-1)$ and $\Delta(k)$ and zoom-lens position $Z(k)$, whereby the focusing compensation value $\Delta(x)$ is obtained. Consequently, since the equation to obtain the focusing compensation value is simplified, the software arrangement and hardware construction can be simplified and accordingly, the production cost can be reduced.

Interpolation by way of a spline curve or another function maybe employed instead of the linear interpolation of the section between set zooming positions $Z(k-1)$ and $Z(k)$. Furthermore, the interpolation accuracy can be improved by setting an interval and the number of the set zooming positions. Still furthermore, the focusing compensation value $\Delta(x)$ of the focus lens is calculated every zooming operation. However, the focusing compensation values may be obtained for every predetermined zoom-lens position and may be stored as a table on a memory, instead. Consequently, the zooming speed of the zooming including the focusing of the focus lens can be improved.

In the foregoing embodiment, the first lens group 2 serves as the focus lens and the second and fourth lens groups 3 and 5 serve as the focus lens. The third lens group 4 serves as the fixed lens. However, the first lens group may serve as the focus lens, the second and third lens groups 3 and 4 may serve as the zoom lens, and the fourth lens group 5 may serve as the fixed lens, instead. Further, the invention may be applied to any arrangement of zoom lens, for example, to an arrangement that the focus and zoom lenses are independent from each other.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A mechanical cam type zoom lens device comprising:
   a focus lens;
   a focus lens driver moving the focus lens along an optical axis so that a subject is in focus;

a zoom lens;

a zoom lens driver moving the zoom lens along the optical axis by a predetermined cam groove;

a controller controlling each driver;

a movement position detector detecting movement positions of the focus and zoom lenses moved by the drivers respectively;

a reference compensation value calculating unit setting a plurality of zooming positions for the zoom lens when the focus lens is located at a predetermined focusing position and calculating an amount of movement from the predetermined focusing position in a case where the focus lens is adjusted to be in focus when the zoom lens is located at each set zooming position, the calculated amount of movement serving as a reference compensation value;

a storage storing data of the reference compensation values;

a focusing compensation value calculating unit calculating a focusing compensation value for the focus lens in a case where the zoom lens is located at the movement position, based on the set zooming positions, the reference compensation value read from the storage and the movement position of the zoom lens; and a focusing unit focusing the focus lens based on the calculated focusing compensation value so that the focus lens is focalized.

2. The mechanical cam type zoom lens device according to claim 1, further comprising a section calculating unit executing calculation to obtain a section which is defined between the zooming positions adjacent to each other and in which the movement position of the zoom lens detected by the position detector is contained, wherein the focusing compensation value calculating unit reads from the storage each reference compensation value at the adjacent set zooming positions and executes linear interpolation for the section between the adjacent set zooming positions containing the movement position, based on the adjacent set zooming positions, each reference compensation value and the movement position of the zoom lens, thereby calculating a focusing compensation value of the focus lens.

3. The mechanical cam type zoom lens device according to claim 1, wherein the focus lens includes a body tube and a focusing ring having a first driving gear so as to be moved in synchronization with the body tube; the focus lens driver includes a first drive motor driving the first driving gear of the focusing ring and a first motor driver supplying driving power to the first drive motor; the zoom lens includes a zooming ring having a second driving gear; and the zoom lens driver includes a second drive motor driving the second driving gear of the zooming ring and a second motor driver supplying driving power to the second drive motor, the zoom lens device further comprising a lens controlling microcomputer provided with a control program and supplying a driving power supply signal to each of the first and second motor drivers based on the control program.

4. The mechanical cam type zoom lens device according to claim 2, wherein the focus lens includes a body tube and a focusing ring having a first driving gear so as to be moved in synchronization with the body tube; the focus lens driver includes a first drive motor driving the first driving gear of the focusing ring and a first motor driver supplying driving power to the first drive motor; the zoom lens includes a zooming ring having a second driving gear; and the zoom lens driver includes a second drive motor driving the second driving gear of the zooming ring and a second motor driver supplying driving power to the second drive motor, the zoom lens device further comprising a lens controlling microcomputer provided with a control program and supplying a driving power supply signal to each of the first and second motor drivers based on the control program.

5. The mechanical cam type zoom lens device according to claim 1, wherein the movement position detector includes a potentiometer detecting an amount of rotation of each of the focus and zoom lenses as a voltage value, an analog/digital converter converting the voltage detected by the potentiometer to a digital signal, and a lens control microcomputer provided with a control program and detecting the movement position of each of the focus and zoom lenses based on the converted digital signal and the control program.

6. The mechanical cam type zoom lens device according to claim 2, wherein the movement position detector includes a potentiometer detecting an amount of rotation of each of the focus and zoom lenses as a voltage value, an analog/digital converter converting the voltage detected by the potentiometer to a digital signal, and a lens control microcomputer provided with a control program and detecting the movement position of each of the focus and zoom lenses based on the converted digital signal and the control program.

7. The mechanical cam type zoom lens device according to claim 3, wherein the movement position detector includes a potentiometer detecting an amount of rotation of each of the focus and zoom lenses as a voltage value, an analog/digital converter converting the voltage detected by the potentiometer to a digital signal, and a lens control microcomputer provided with a control program and detecting the movement position of each of the focus and zoom lenses based on the converted digital signal and the control program.

8. The mechanical cam type zoom lens device according to claim 4, wherein the movement position detector includes a potentiometer detecting an amount of rotation of each of the focus and zoom lenses as a voltage value, an analog/digital converter converting the voltage detected by the potentiometer to a digital signal, and a lens control microcomputer provided with a control program and detecting the movement position of each of the focus and zoom lenses based on the converted digital signal and the control program.

* * * * *